United States Patent [19]

Vidal et al.

[11] 4,116,772

[45] Sep. 26, 1978

[54] FREE-FLOWING FUNGAL ENZYME COMPOSITION

[75] Inventors: Frederick D. Vidal, Englewood Cliffs; Albert B. Gerrity, Hazlet, both of N.J.

[73] Assignee: Pennwalt Corporation, Philadelphia, Pa.

[21] Appl. No.: 600,323

[22] Filed: Jul. 30, 1975

[51] Int. Cl.$^2$ ............................ C07G 7/02; A21D 8/04
[52] U.S. Cl. ........................................ 195/64; 426/64; 195/68
[58] Field of Search .............. 195/64, 63, 68; 426/20, 426/61, 62, 64; 252/385

[56] References Cited

U.S. PATENT DOCUMENTS

| | | | |
|---|---|---|---|
| 2,651,593 | 9/1953 | Goering et al. | 195/64 X |
| 2,979,440 | 4/1961 | Smythe | 195/64 |
| 3,031,306 | 4/1962 | Freed | 426/20 X |
| 3,085,944 | 4/1963 | Valentine | 252/385 X |
| 3,249,512 | 5/1966 | Bode | 195/31 R |
| 3,367,883 | 2/1968 | Stahlheber | 252/385 |

*Primary Examiner*—Lionel M. Shapiro

[57] ABSTRACT

This invention provides a process for preparing a fungal amylase composition as a free-flowing powder having sufficient shelf life for use as a source of alpha-amylase to add to flour used for baking purposes.

8 Claims, No Drawings

FREE-FLOWING FUNGAL ENZYME COMPOSITION

This invention relates to fungal alpha-amylase enzyme compositions and to an improved method for preparing them as a free-flowing powder sufficiently stable for commercial use.

Diastatic enzymes or diastase are substances which hydrolyze starch to dextrins and ultimately to glucose and which contain principally alpha-amylases, but there may also be present other enzymic complexes such as esterases, carbohydrases, maltases, peptidases, cellulases, pectinases, and proteases. Further description of such enzyme complexes may be found in the literature such as "The Enzyme" edited by Sumner and Myrback, Academic Press Inc., New York (1952) and "Dynamic Aspects of Biochemistry", E. Baldwin, Cambridge University Press (1952).

Baking and related industries currently increase the naturally occurring diastase in wheat and wheat flour by the addition of a diastase during processing. A minimum level of diastase is necessary to promote adequate gas production and proper starch modification during fermentation of the dough.

The need for adding additional alpha-amylase to flour used for baking purposes manifested itself at the time when combines for harvesting wheat came into general use. Prior to this, wheat was harvested by cutting, forming it into bundles and placing a number of these into a shock. The harvested wheat was then allowed to mature in the shock before it was threshed. During this aging period some of the grain sprouted and this resulted in an increased amount of active alpha-amylase which ended up in the flour. With the advent of the combine, which combined the harvesting and threshing processes into one, the grain had no opportunity to sprout and thus the milled flour contained but a limited, small quantity of alpha-amylase.

A microbial diastase concentrate is a standard preparation well known in the industry and is obtainable by several methods. Diastase preparations may be made in accordance with methods described, for example, in U.S. Pat. No. 2,599,532. One common procedure is to grow the culture by a submerged method of preparation or by a tray process, extract the diastase and then to concentrate it by vacuum concentration, reverse osmosis or ultrafiltration. Standard methods employed for the incubation of Aspergilli and for recovering the enzymes from their culture are reviewed in U.S. Pat. No. 3,293,142. Such concentrates have an SKB value of at least about 12,500 units per gram. Under use conditions, the diastatic activity for these preparations is often standardized at 5,000 SKB units per gram of material. This unit expresses the alpha-amylase activity as measured by the method of Sandstedt, Kneen and Blish as described in Cereal Chemistry 16, 712 (1939) "A Standardized Wohlgemuth Procedure for Alpha-Amylase Activity".

Heretofore, free-flowing, stable alpha-amylase compositions for the baking industry have been made by blending a concentrated diastatic preparation with an inert filler such as sugars, diatomaceous earth, starch, pectinous materials, dextrins, kaolin and various salts and thereafter drying the resultant product. However, the removal of excess water by a prolonged drying process, such as under vacuum, increases the incidence of decreased diastatic activity due to instability of the diastase under the drying conditions.

The sources of alpha-amylase are fairly extensive, the principal commercial ones being fungal (*Aspergillus oryzae*), bacterial (*bacillus subtilis*), and cereal (malted wheat and barley). All of these preparations exhibit good activity for baking use over a pH range of about 5.0 to about 5.5 but differ significantly in their thermal stabilities. Fungal alpha-amylase is a preferred material in the baking industry. It has high proteolytic activity as well as alpha-amylase activity and the changes of over liquefaction of starch during the baking process are minimized with its use because of this enzyme's loss of activity on heating to baking temperatures. "Biochemistry of Foods", Academic Press, 1971, pages 130–133.

Fungal alpha-amylase is far more sensitive to heat than either the bacterial or cereal preparations. It can be seen that the thermal conditions for preparing a free-flowing, stable alpha-amylase composition for the baking industry, as set forth above, are far more critical for the diastatic activity of the fungal alpha-amylase than for the bacterial or cereal preparations. It is, therefore, more pressing that a method be devised to prepare a fungal alpha-amylase composition which does not require the use of heat to dry the material and which is also economical.

Attempts have been made to make a free-flowing enzyme composition by blending a fungal diastase concentrate with commercial starch, which normally contains between 10 and 17% moisture, with no subsequent drying. The resulting free-flowing products which were produced and which contain the desired diastatic activity as measured by SKB units had poor storage stability. This instability of higher moisture content products may in part be due to activity of the proteases present.

The criterion for storage stability is that the product should not average a loss of more than 5% of its diastatic activity per month when stored at 30° C. over an extended period. This criterion can be achieved if the water content is less than 8.5% for the prepared compositions of this invention.

The principal object of this invention is to provide a method of preparing a free-flowing fungal alpha-amylase composition having a sufficiently high diastatic activity and diastase stability to permit use in the baking industry. The product is relatively inexpensive to produce and may be manufactured at a low capital investment.

In accordance with this invention, a liquid fungal alpha-amylase concentrate is uniformly mixed with an edible starch having a maximum of about 3% water in a proportion such that there is a minimum of 1,000 and preferably at least 3,000 SKB units per gram and less than 8.5% moisture in the mixture. Such a product can be used by the baking industry in an amount which is reasonable for augmenting the alpha-amylase content of the flour being employed. For example, a reasonable amount is the addition of 5g. of the diastase-starch preparation containing 1,000 SKB units per gram to 100 pounds of flour.

The fungal alpha-amylase concentrate which is useful for this purpose is available as liquid food-grade enzyme preparations having a minimum alpha-amylase activity of 12,500 SKB units and is usually between 25 and 30% solids with the remainder as water and a maximum alpha amylase activity of about 50,000 SKB units which is usually between 30 and 35% solids and the remainder water. Rhozyme 87-L Concentrate, manufactured by Rohm and Haas Company, conforms to this range of activity and was convenient for carrying out the working examples herein.

The edible starch useful for the purpose may be derived from such diverse sources as banana, bean, cassava, corn, maize, oats, peas, potato, rice and sweet potato. The preferred dried starch is that from corn. Dry starch on standing under normal atmospheric conditions will stabilize at a water content of between about 10 and 17%. Starch having a low water content is usually obtained by driving the water off with heat to the required low moisture content. This material is stored in the absence of moisture or under very dry conditions to prevent the starch from again taking on moisture from the atmosphere. Starch having a moisture content of less than its normal amount is commercially available. The starch used herein must have a moisture content of no greater than about 3%. The hydrogen ion concentration of the starch can be about 4.5 to about 6 with a preferred pH range of from about 5.0 to about 5.5. The starch-enzyme mixture will have a pH range of from about 5.0 to about 6.0 and preferably from about 5.5 to about 5.8.

The following examples are set forth to demonstrate this invention.

EXAMPLE 1

To 26.5g. of low moisture corn starch (3% water by analysis) was added 3.0 grams of Rhozyme 87-L Concentrate, a liquid fungal diastase, containing 43,500 SKB units per gram. The fungal diastase was dispersed into the starch with a spatula, care being taken to break up the large moist lumps. To this was added 0.25g. of silicon dioxide in the form of an expanded silica and 0.25g. of tricalcium phosphate. After blending, this was a fairly free-flowing powder containing a few small lumps. The blend was ground in a mortar with a pestle after which it was sifted through a 30 and then a 40-mesh sieve. The sifted blend was placed in a container and tumbled for 15 minutes to insure uniform enzyme dispersion. A free-flowing, lump-free, uniform powder resulted. Be analysis, this was found to contain 8.1% moisture. The blend was stored at 30° C. for 110 days with the following results.

| Time (Days) | SKB Units Per Gram | % Retention |
| --- | --- | --- |
| 0 | 4390 | 100 |
| 30 | 3820 | 87.1 |
| 60 | 3860 | 87.9 |
| 90 | 3846 | 87.6 |
| 110 | 3820 | 87.1 |

The stability of this preparation was considered excellent.

EXAMPLE 2

The procedure of Example 1 was repeated using 27.7g. of the same low moisture content corn starch and 1.75g. of the liquid Rhozyme 87-L Concentrate. The final blended free-flowing composition contained 7.07% moisture and 2569 SKB units per gram. It was stored at 30° C. for 210 days and the following observations were made.

| Time (Days) | SKB Units Per Gram | % Retention |
| --- | --- | --- |
| 0 | 2569 | 100 |
| 35 | 2530 | 98.5 |
| 91 | 2000 | 77.9 |
| 146 | 1700 | 67.0 |
| 210 | 1730 | 67.3 |

EXAMPLE 3

The procedure of Example 2 was repeated using the same quantities of the corn starch and diastase. The resulting free-flowing powder of uniform particle size contained 6.6% moisture. It was stored as for Example 2 with the following results.

| Time (Days) | SKB Units Per Gram | % Retention |
| --- | --- | --- |
| 0 | 2430 | 100 |
| 35 | 2310 | 95.2 |
| 91 | 1830 | 75.3 |
| 140 | 1630 | 67.1 |
| 210 | 1668 | 68.6 |

EXAMPLE 4

A blend was made of 25.2g. of dried corn starch containing 3% moisture and 1.4g. Rhozyme 33, a solid concentrate containing 45,000 SKB units per gram. To the blend was added and dispersed 2.0 grams of liquid Rhozyme 87-L Concentrate containing 30,000 SKB units per gram. To this was added 0.5g. silicon dioxide and 0.9g. tricalcium phosphate as conditioning agents and the mixture was blended with a spatula to give a free-flowing powder. The blend contained 8.4% moisture and was stored at 30° C. for 92 days. The results of the storage are given below:

| Time (Days) | SKB Units Per Gram | % Retention |
| --- | --- | --- |
| 0 | 3510 | 100 |
| 35 | 3460 | 98.6 |
| 69 | 3440 | 98.2 |
| 92 | 3500 | 99.7 |

It will be seen that there was essentially no loss of activity.

EXAMPLE 5

A pilot plant preparation was made by placing 2560g. of low moisture corn starch (3% moisture), 50g. of silicon dioxide and 90g. of tricalcium phosphate in a Patterson-Kelly Liquid-Solids Twin Shell Blender Model LBS-8 and mixed for 5 minutes. After this 300g. of liquid Rhozyme 87-L Concentrate containing 43,500 SKB units/g. was added to the still tumbling dry ingredient blend in 1½ minutes. The blender was rotated for an additional 8½ minutes for a total blending time of 15 minutes. The blend obtained was of uniform particle size, free-flowing and lumpless. By analysis it was found to contain 8.0% moisture. The free-flowing powder was stored at 30° C. for 110 days. The following stability data were obtained:

| Time (Days) | SKB Units Per Gram | % Retention |
| --- | --- | --- |
| 0 | 3700 | 100 |
| 30 | 3180 | 85.9 |
| 60 | 3200 | 86.5 |
| 90 | 3050 | 82.5 |

-continued

| Time (Days) | SKB Units Per Gram | % Retention |
|---|---|---|
| 110 | 3180 | 85.9 |

The blends exemplified above were quite satisfactory for use in the baking industry.

EXAMPLE 6

A free-flowing mixture was prepared by adding 4.5 grams of the liquid Rhozyme 87-L Concentrate to 24.2g of corn starch having a 5% moisture content, breaking up the large lumps and then combining 0.5% silicon dioxide and 0.8% tricalcium phosphate to the dry mixture. This material was mortared and sifted to obtain an excellent free-flowing powder having a moisture content of 11.85%.

The following stability data were obtained:

| Time (Days) | SKB Units Per Gram | % Retention |
|---|---|---|
| 0 | 3880 | 100 |
| 33 | 3040 | 78.4 |
| 110 | 1990 | 51.4 |

This material does not meet the storage stability criterion of the compositions of this invention which is a practical necessity for use in the baking industry.

The conditioning agents such as silicon dioxide and/or tricalcium phosphate used in the above examples are not critical with respect to activity, performance or the manufacture of an alpha-amylase preparation. It is often necessary, however, to add such conditioning agents as an aid in preventing caking and for improving the free-flowing properties. A free-flowing product is required to feed the preparation accurately and to ensure the even distribution of the alpha-amylase composition with large proportions of flour during mixing for the preparation of a baking dough.

I claim:

1. A process for preparing a fungal alpha-amylase composition suitable for use in the baking industry, which comprises uniformly blending a liquid fungal alpha-amylase concentrate having a minimum diastatic activity of 12,500 SKB units with a dried starch containing a maximum of about 3% moisture to obtain a free-flowing alpha-amylase composition having a diastatic activity of at least 1,000 SKB units and a moisture content of less than 8.5%.

2. The process according to claim 1 wherein the prepared free-flowing alpha-amylase composition has a diastatic activity of at least 3,000 SKB units.

3. The process according to claim 1 wherein the dried starch is corn starch.

4. The process according to claim 2 wherein the dried starch is corn starch.

5. The process according to claim 1 which includes the addition of conditioning agents.

6. The process of claim 5 wherein the conditioning agent includes tricalcium phosphate.

7. The process of claim 5 wherein the conditioning agent includes silicon dioxide.

8. An alpha-amylase composition prepared according to the process of claim 1.

* * * * *